(12) United States Patent
Matsushita et al.

(10) Patent No.: US 7,549,590 B2
(45) Date of Patent: Jun. 23, 2009

(54) CONTACTLESS IC CARD

(75) Inventors: Yuka Matsushita, Higashihiroshima (JP); Futoshi Nakabe, Hiroshima (JP); Eiji Ueda, Toyota-gun (JP)

(73) Assignee: Panasonic Corporation, Osaka (JP)

( * ) Notice: Subject to any disclaimer, the term of this patent is extended or adjusted under 35 U.S.C. 154(b) by 598 days.

(21) Appl. No.: 10/546,528

(22) PCT Filed: Oct. 15, 2004

(86) PCT No.: PCT/JP2004/015646

§ 371 (c)(1),
(2), (4) Date: Aug. 23, 2005

(87) PCT Pub. No.: WO2005/038703

PCT Pub. Date: Apr. 28, 2005

(65) Prior Publication Data

US 2006/0138244 A1 Jun. 29, 2006

(30) Foreign Application Priority Data

Oct. 20, 2003 (JP) ............................ 2003-359893

(51) Int. Cl.
*G06K 19/00* (2006.01)
(52) U.S. Cl. ...................... 235/487; 235/375; 235/380
(58) Field of Classification Search ................ 235/375, 235/380, 382, 382.5, 487
See application file for complete search history.

(56) References Cited

U.S. PATENT DOCUMENTS

| 6,946,950 | B1 * | 9/2005 | Ueno et al. ................. 340/10.1 |
| 2002/0027832 | A1 | 3/2002 | Engelmann |
| 2002/0195493 | A1 | 12/2002 | Dell |

FOREIGN PATENT DOCUMENTS

| EP | 1 111 557 | 6/2001 |
| JP | 11-238104 | 8/1999 |
| JP | 2000-172818 | 6/2000 |
| JP | 2001-109861 | 4/2001 |

* cited by examiner

*Primary Examiner*—Karl D. Frech
(74) *Attorney, Agent, or Firm*—Wenderoth, Lind & Ponack, L.L.P.

(57) ABSTRACT

A contactless integrated circuit (IC) card (11) is comprised of the following: a first antenna coil (102) and a second antenna coil (103) for generating an electromotive force by receiving electromagnetic waves from a reader/writer; a first electromotive force measuring unit (311) and a second electromotive force measuring unit (312) for respectively measuring the electromotive force generated by each of the antenna coils; an electromotive force comparing unit (313) for comparing the characteristics of the electromotive forces which are respectively generated by the respective antenna coils and then measured; and an application selecting/executing unit (215) for selecting one application from a program storing unit (216) based on the comparison made by the electromotive force comparing unit (313) and executing the selected application.

15 Claims, 14 Drawing Sheets

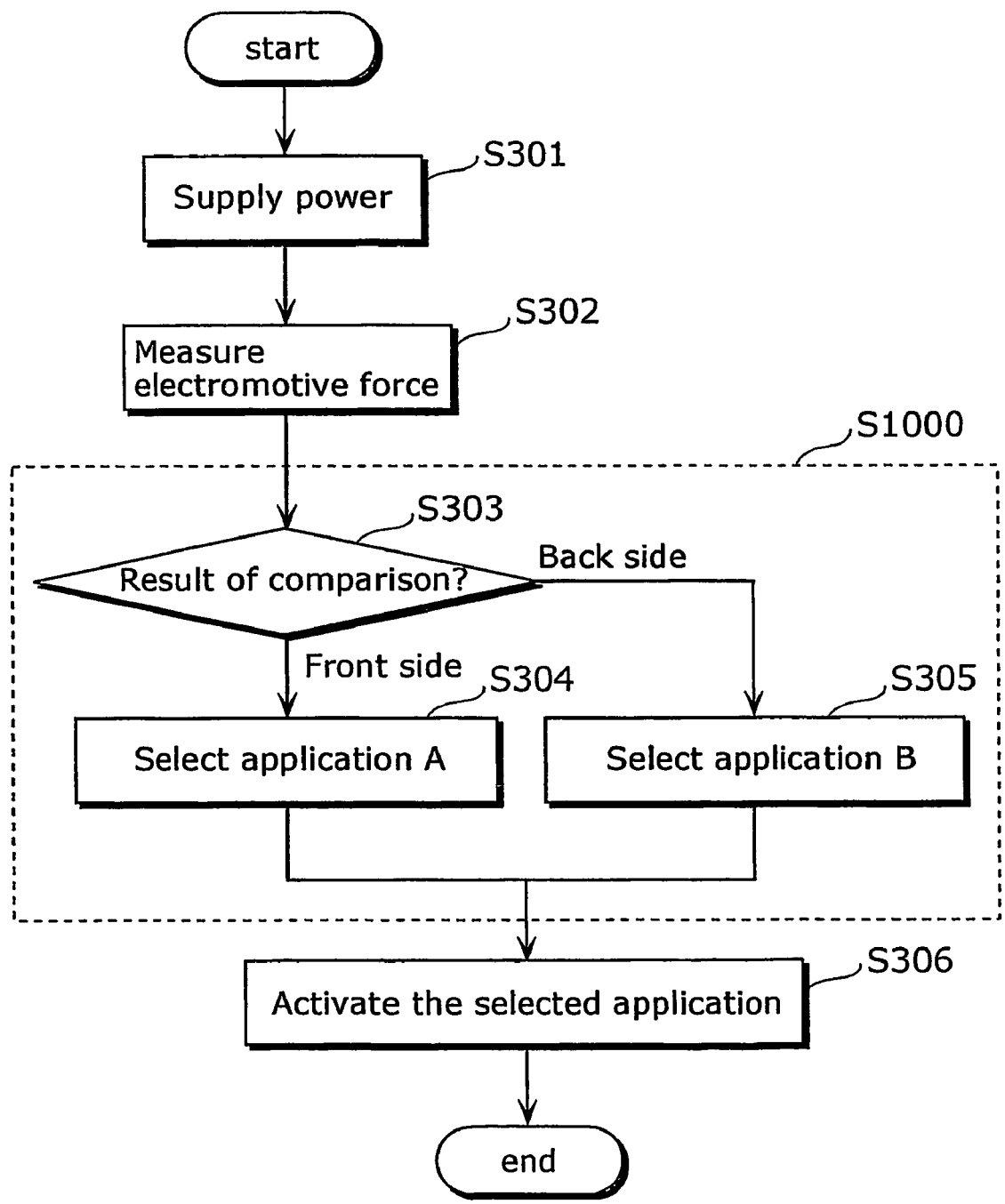

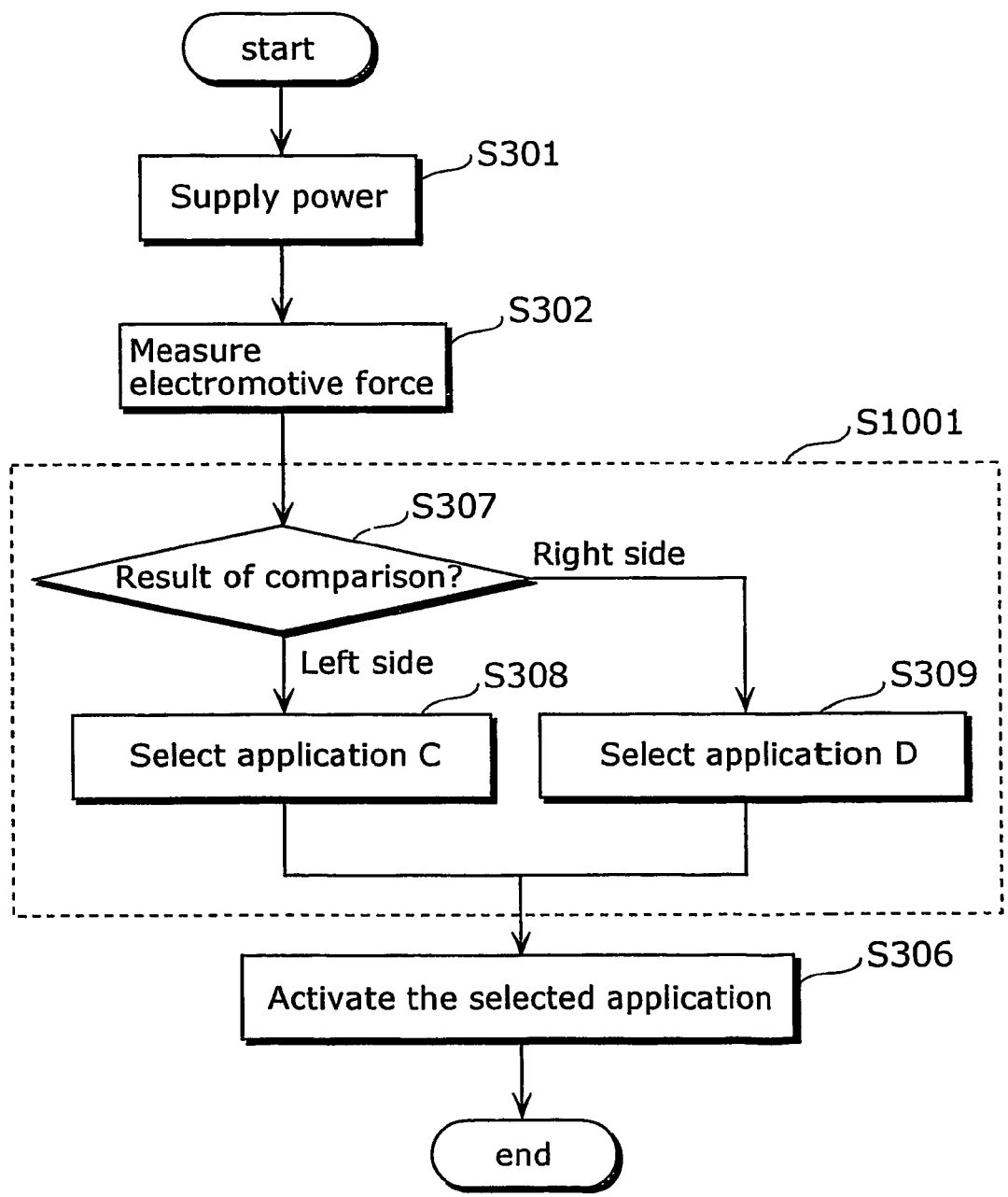

CONTACTLESS IC CARD

TECHNICAL FIELD

The present invention relates to a contactless integrated circuit (IC) card, in particular, to a contactless IC card that can execute multiple applications and can also facilitate the user to select one application.

BACKGROUND ART

Magnetic cards including credit cards have been utilized conventionally regardless of the purpose e.g., business. Recently, however, the magnetic card has surrendered its position to an IC card. The conceivable reasons are that an IC card has a lower risk for tampering and excels in security as well as a large storage capacity, arid that a contactless interface can be applied to the IC card by wirelessly communicating with a host terminal. The IC cards with these advantages are highly prevailed in the field of transportation. The effects are verified particularly in the processing of examining tickets which requires massiveness and a high speed, and its future applications in various fields are further considered.

Firstly, an overview of the IC card using a contactless interface (i.e., a contactless IC card) will be explained.

FIG. 1 is an appearance diagram showing a contactless IC card and a reader/writer which are generally used, and a situation in which they are used.

The contactless IC card 10 has a single antenna coil 101, and communicates with a reader/writer 20 using the antenna coil 101 wirelessly.

FIG. 2 is a diagram showing a hardware configuration of the general contactless IC card 10 shown in FIG. 1.

As shown in FIG. 2, the contactless IC card 10 is comprised of the following: the antenna coil 101 which generates an electromotive force by receiving electromagnetic waves from the reader/writer 20; a ROM 201 in which an application program is stored; a RAM 203 for temporarily storing data; a CPU 202 for performing control such as calculations; an EEPROM 204 for storing data; and a bus 500 for combining these units.

It is possible to install multiple applications in a single IC card regardless of whether the IC card is contact or contactless. That is to say that the user of the contactless IC card in which multiple applications are installed does not need to carry plural contactless IC cards respectively having a different application, and can receive various services with a single contactless IC card. For example, in the case of taking different rail lines managed by different companies, it has conventionally been required to carry at least two kinds of cards. With the contactless IC card in which multiple application programs are stored, however, the user needs to carry only one card, and, as described above, it is possible to realize a smooth transfer since the user only needs to pass the card over a terminal device that is set at the ticket gate.

However, in the case where multiple applications are installed in a single contactless IC card, it is required to switch between the applications installed in the card according to the service to be provided, therefore, a technique to select and activate the application desired by the user as fast as possible is currently researched.

Some conventional cards, contact or contactless, realize a selection out of multiple applications by switching buttons. For instance, there is a conventional IC card with a structure in which a high reflective liquid crystal unit and an application type selection unit are placed on the surface, so that when the user selects an application by pressing a button, the selected application is displayed on the liquid crystal unit.

However, the problems are that the hardware configuration is complicated and breakable, and that a unit cost of the card is high, due to the conventional structure in which the liquid crystal unit and the buttons are placed on the card.

The user is required to operate buttons for switching between the applications, therefore, it takes time and troubles the user for the switching operation. Such complication of the switching operation may be a cause of interrupting the flow of people particularly in the processing of examining tickets.

In view of the above circumstances, in the case of using a single contactless IC card having plural applications, it is an important task to achieve a simple hardware configuration together with a facility in the user's operation for switching between the applications.

It is also a challenge to switch between more than two kinds of applications with a single contactless IC card considering the actual state where the number of applications intended for a contactless IC card is increasing.

The present invention is conceived in order to overcome such problems, and an object thereof is to provide a contactless IC card that can achieve the user's prompt switching between the applications by facilitating the method of switching without adding an extra hardware mechanism on the surface of the card.

DISCLOSURE OF INVENTION

In order to achieve the above object, the contactless IC card according to the present invention implements the following technical units.

Namely, the contactless IC card according to the present invention is a contactless integrated circuit (IC) card that can execute a plurality of application programs, comprising: a plurality of antenna coils, each generating an electromotive force by receiving electromagnetic waves from a reader/writer; an electromotive force measuring unit operable to measure the electromotive force generated by each of the antenna coils when the contactless IC card is passed over the reader/writer; an electromotive force comparing unit operable to compare characteristics of the electromotive forces which are measured by the electromotive force measuring unit; and an application selecting/executing unit operable to select one application program based on the comparison made by the electromotive force comparing unit, and execute the selected application program.

Thus, plural antenna coils are laid inside the card, and an application program to be executed is selected based on the comparison between the characteristics of the electromotive forces respectively generated by the antenna coils. It is therefore possible to simplify the hardware configuration on the surface of the contactless IC card as well as to facilitate the user's operation of switching between the applications.

A part of the antenna coils may be laid beneath a surface of a front side and another part of the antenna coils may be laid beneath a surface of a back side of the contactless IC card.

According to the structure above, the user can select a desired application from two applications by choosing either front or back side of the card when passing the card.

A part of the antenna coils may be laid on a right side and another part of the antenna coils may be laid on a left side beneath one surface or both surfaces of the contactless IC card.

According to the structure above, the user can select a desired application from two applications by choosing the direction in which the card is passed. The user can further select a desired application from more than two applications by choosing the direction and the face when passing the card.

It is preferable that the contactless IC card further comprise a program storing unit operable to store the plurality of application programs respectively associated with each of the antenna coils and display units operable to indicate each of the application programs associated with said each antenna coil.

Thus, the antenna coil that needs to be brought closer to the reader/writer is presented so that one of the provided applications is activated. It is therefore possible for the user to verify the face and the direction of the card so as to select a desired application without making any mistakes.

It is desirable that a concave portion be formed by notching an edge on one surface of the contactless IC card.

Thus, the user can select a desired application even he/she cannot check the card with eyes, because the face and the direction of the card is discernible by touching a concave part.

It should be noted that the present invention can be realized not only as such contactless IC card, but also as the application selection method that includes the characteristic units in the contactless IC card as steps, and even as a program that causes a computer to execute these steps. Such program can be surely distributed via a storage medium such as a CD-ROM or a transmission medium such as the Internet.

As described above, the contactless IC card according to the present invention has plural antenna coils, measures the electromotive forces respectively generated by the antenna coils, compares the characteristics of the generated electromotive forces, selects a single application based on the comparison and executes the selected application. The user therefore can promptly switch the plural applications installed in a single contactless IC card with simple operations.

Since the plural antenna coils are laid inside the card, the external configuration of the hardware can be simplified without adding an extra one.

In addition, it is possible to switch between various kinds of applications with simple operation not only by laying two antenna coils beneath a surface of either front or back side, but also by laying each two antenna coils side by side beneath the surface of both sides.

FURTHER INFORMATION ABOUT TECHNICAL BACKGROUND TO THIS APPLICATION

The disclosure of Japanese Patent Application No. 2003-359893 filed on Oct. 20, 2003 including specification, drawings and claims is incorporated herein by reference in its entirety.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 7 is a flowchart showing the procedure used in operating the contactless IC card according to the first embodiment;

FIG. 9 is a flowchart showing the procedure used in operating the contactless IC card according to the second embodiment;

BEST MODE FOR CARRYING OUT THE INVENTION

The following describes the embodiments of the present invention with reference to the diagrams.

FIRST EMBODIMENT

Firstly, the contactless IC card according to the first embodiment of the present invention will be explained.

The first embodiment explains the case in which each of two antenna coils are laid beneath each surface of the contactless IC card.

Figure 1:
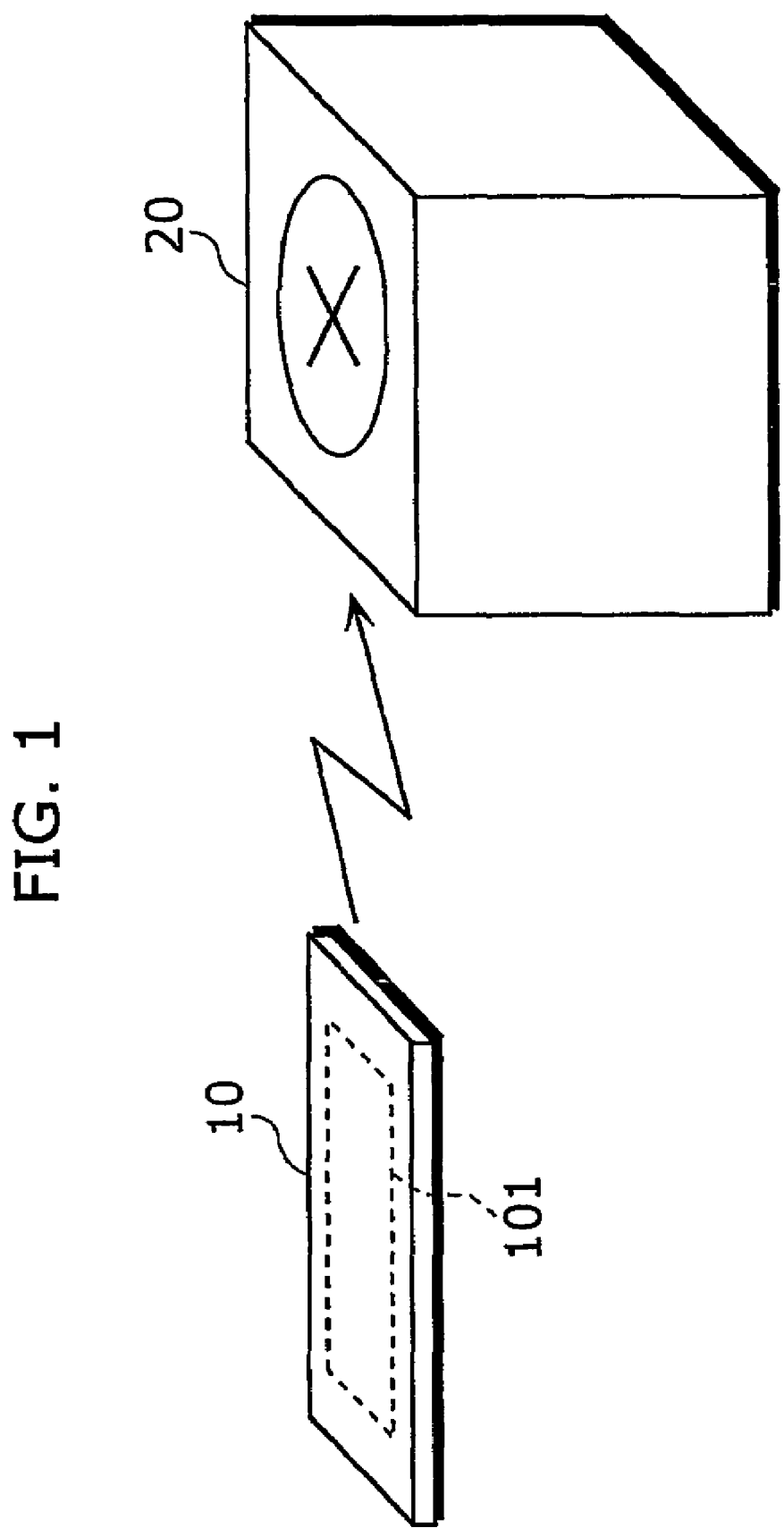
FIG. 1 is an appearance diagram showing a contactless IC card and a reader/writer which are generally used, and a situation in which they are used.
Figure 2:
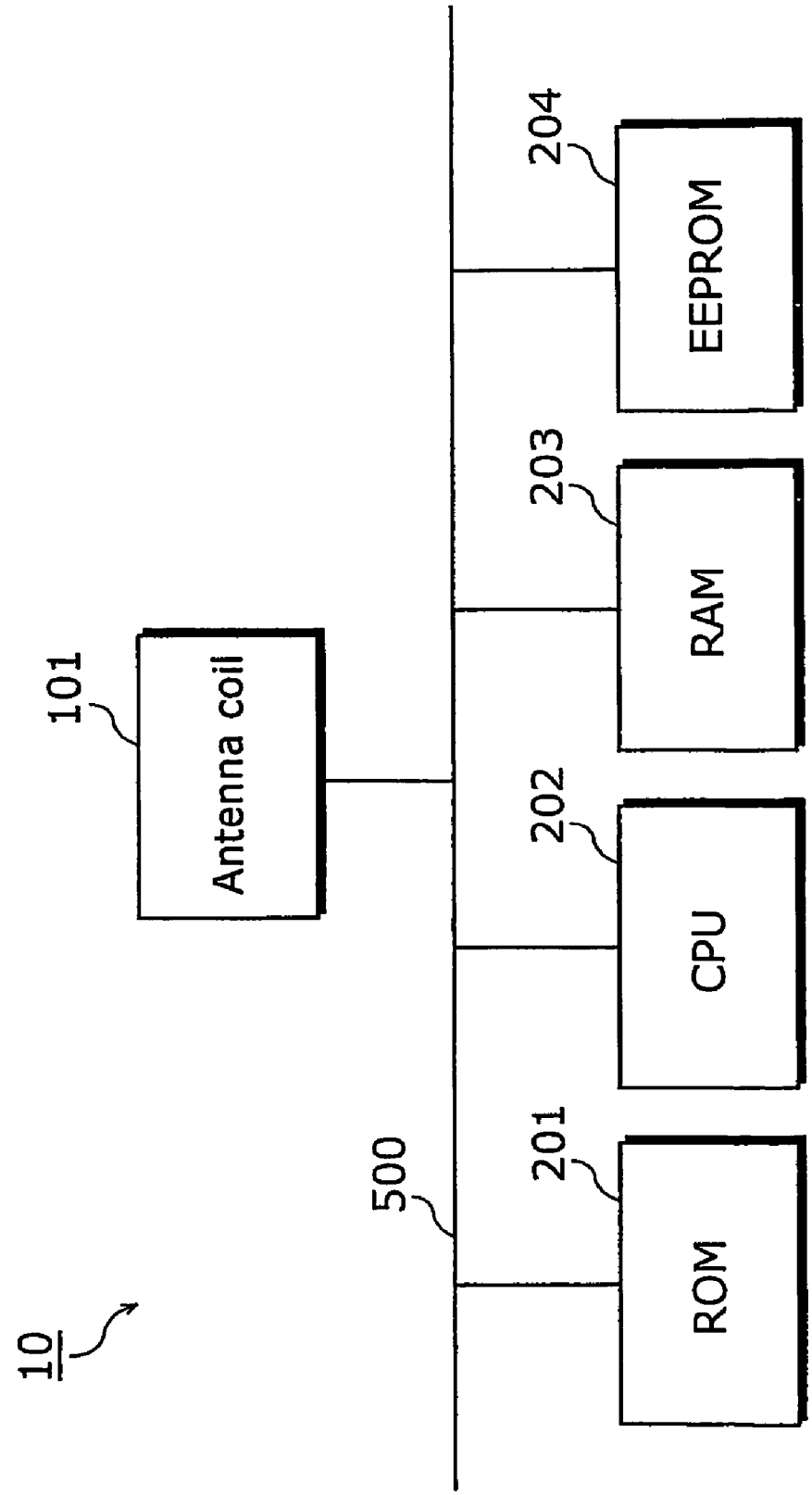
FIG. 2 is a diagram showing the hardware configuration of the general contactless IC card shown in FIG. 1.

In comparison to the general contactless IC card described above (FIG. 1), the contactless IC card according to the first embodiment of the present invention has the same external structure as the general contactless IC card, but has an internal structure distinguishingly different from that of the general contactless IC card.

Figure 3:
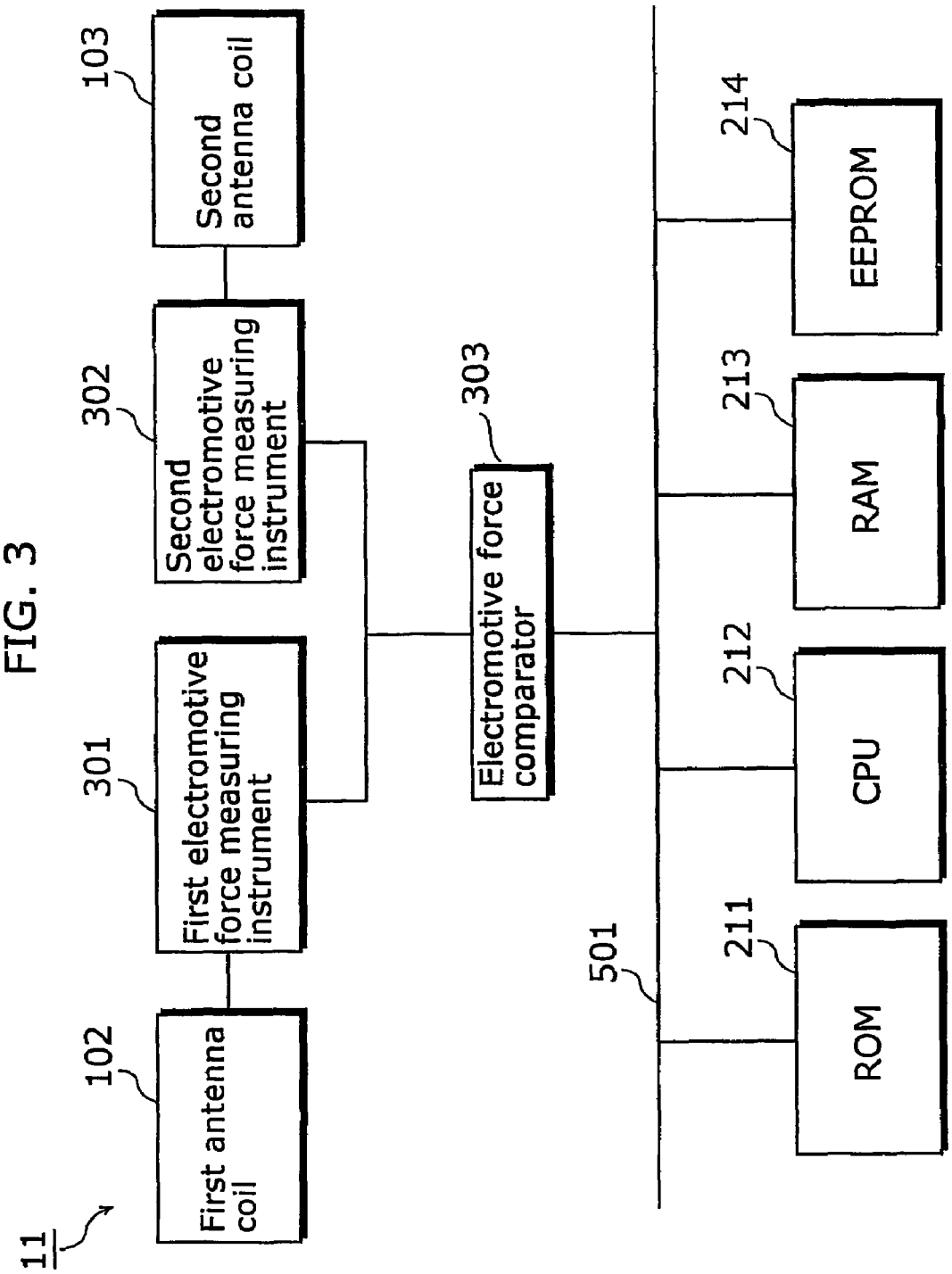
FIG. 3 is a diagram showing the hardware configuration of the contactless IC card according to a first embodiment of the present invention.

FIG. 3 is a diagram showing the hardware configuration of the contactless IC card according to the first embodiment.

The contactless IC card 11 according to the present embodiment, as a hardware configuration, is comprised of the following: a first antenna coil 102 and a second antenna coil 103 for generating an electromotive force by receiving electromagnetic waves from the reader/writer; a first electromotive force measuring instrument 301 and a second electromotive force measuring instrument 302 for measuring the respective electromotive force generated by the first and second antenna coils 102 and 103; an electromotive force comparator 303 for comparing the characteristics of the electromotive forces respectively measured; a ROM 211 storing multiple application programs that are associated with the respective antenna coils; a RAM 213 for temporarily storing data; a CPU 212 for performing control such as calculations; an EEPROM 214 for recording data; and a bus 501 for combining these units.

The EEPROM 214 can be realized, for instance, with a non-volatile memory such as an Electrically Erasable Programmable Read Only Memory (EEPROM), and a Ferroelectric Random Access Memory (FeRAM) may be used instead of the EEPROM.

Figure 4:
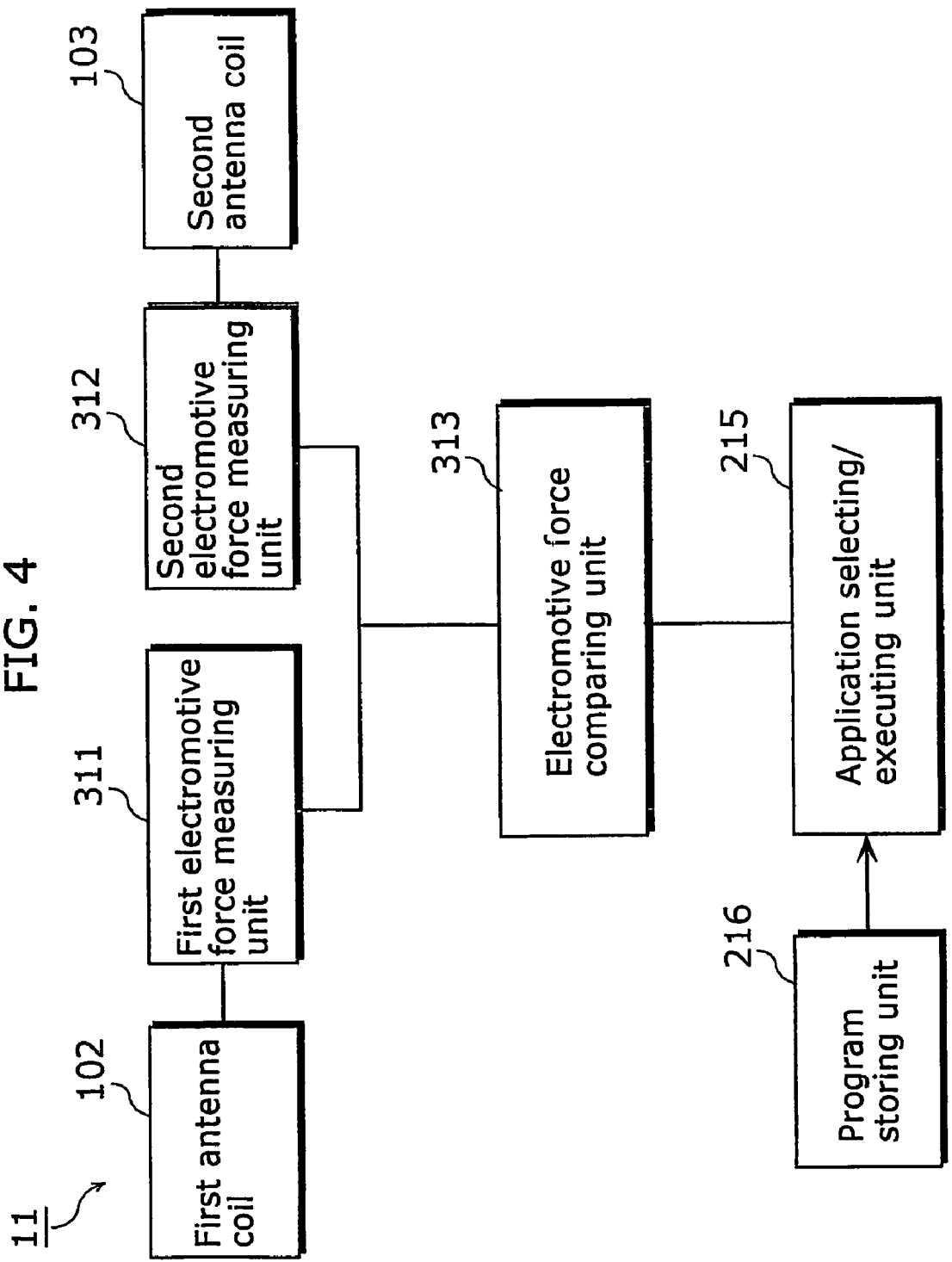
FIG. 4 is a functional block diagram showing the functional structure of the contactless IC card according to the first embodiment.

FIG. 4 is a functional block diagram showing the functional structure of the contactless IC card 11 according to the first embodiment.

As shown in FIG. 4, the contactless IC card 11 according to the first embodiment has a functional configuration that is comprised of the following: a first electromotive force measurement unit 311 for measuring the electromotive force generated by the first antenna coil 102; a second electromotive force measurement unit 312 for measuring the electromotive force generated by the second antenna coil 103; an electromotive comparing unit 313 for comparing the characteristics of the electromotive forces measured by the first and second electromotive force measurement units 311 and 312; a program storing unit 216 that stores plural application programs that are associated with the respective antenna coils; and an application selecting/executing unit 215 for selecting, based on the comparison result obtained from the electromotive force comparing unit 313, one of the application programs stored in the program storing unit 216, and executing the selected program.

Figure 5A:
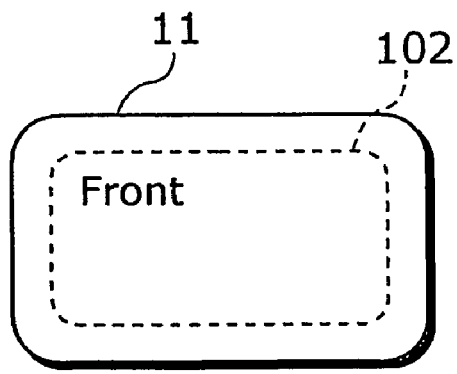
FIG. 5A is a plain view showing the appearance of one side of the contactless IC card according to the first embodiment.

FIG. 5A is a plain view showing the appearance of one side (front) of the contactless IC card 11. As shown in the diagram, the first antenna coil 102 is laid beneath the surface of the front side of the contactless IC card 11.

Figure 5B:
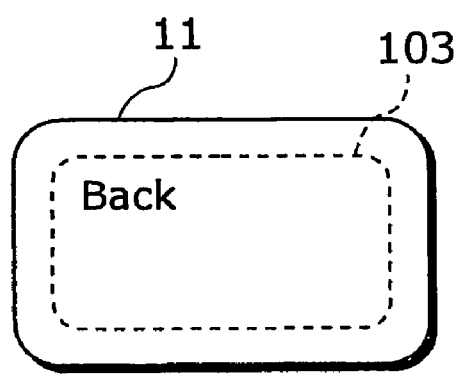
FIG. 5B is a plain view showing the appearance of the other side of the contactless IC card according to the first embodiment.

FIG. 5B is a plain view showing the appearance of the other side (back) of the contactless IC card 11. As shown in the diagram, the second antenna coil 103 is laid beneath the surface of the back side of the contactless IC card 11.

Figure 5C:
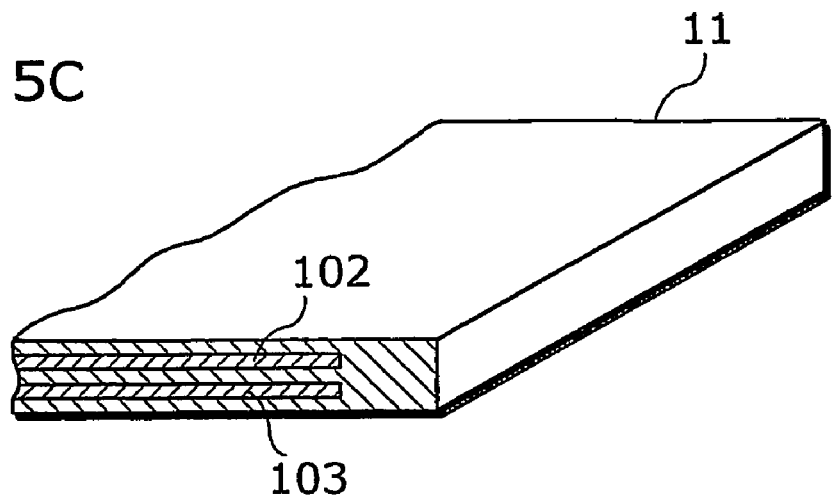
FIG. 5C is a cross sectional oblique perspective view of the part of the contactless IC card according to the first embodiment.

FIG. 5C is a cross-sectional oblique perspective view of a part of the contactless IC card 11. As shown in the diagram, the second antenna coil 103 is laid in a position deeper than that of the first antenna coil 102, in the contactless IC card 11, so that the first antenna coil 102 is laid just above the second antenna coil 103. It should be noted that an integrated circuit in which the ROM 211 and the CPU 212 are built is surely embedded in the contactless IC card 11.

The operation of the contactless IC card 11 as configured as above will be explained in detail with reference to FIGS. 6 and 7.

Figure 6A:
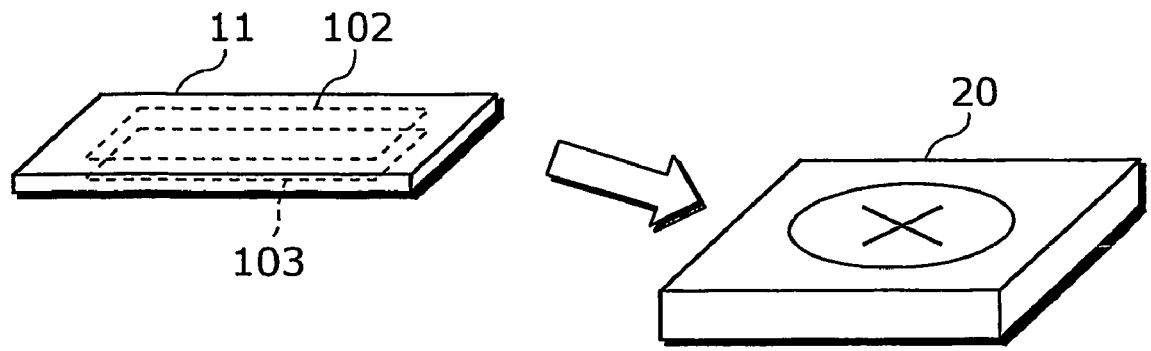
FIG. 6A is a diagram for explaining the method of operating the contactless IC card according to the first embodiment.

FIG. 6A is a diagram for explaining the method of operating the contactless IC card 11 while FIG. 7 is a flowchart showing the procedure used in operating the contactless IC card after the power is supplied until an application is selected.

Firstly, as shown in FIG. 6A, in the case where the user passes the contactless IC card 11 with the side of the second antenna coil 103 facing the reader/writer 20 (the card is passed over the reader/writer 20 in the direction indicated by an arrow), the contactless IC card 11 receives electromagnetic waves from the reader/writer 20 and the power is supplied (S301). The first antenna coil 102 and the second antenna coil 103 to which the power is supplied respectively generate electromotive forces. The generated electromotive forces are measured respectively by the first electromotive measurement unit 311 and the second electromotive measurement unit 312 (S302). The measured electromotive forces are then compared by the electromotive force comparing unit 313 (S303).

Figure 6B:
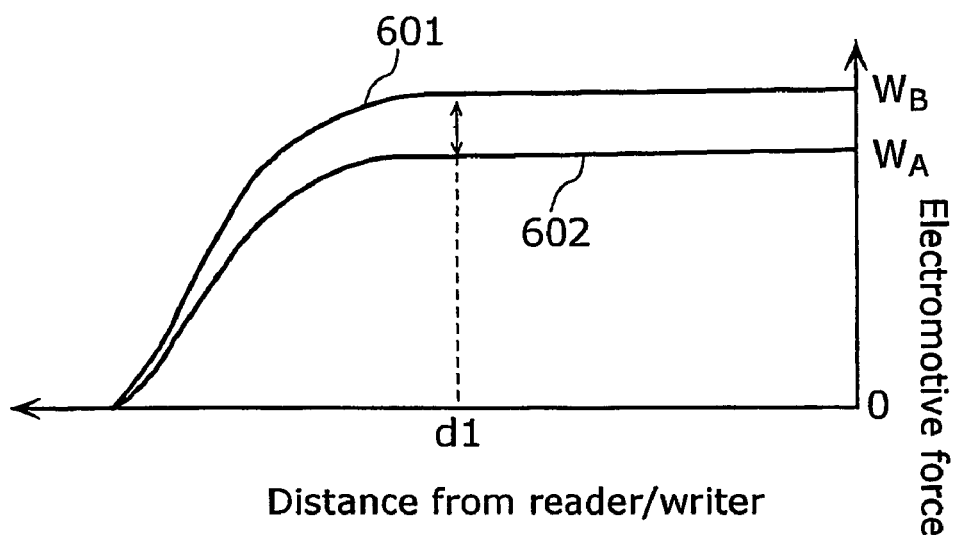
FIG. 6B is a diagram showing the relationship between the distance between the contactless IC card and the reader/writer, and the electromotive force generated by each antenna coil.

FIG. 6B is a diagram showing the relationship between the distance between contactless IC card 11 and the reader/writer 20, and the electromotive force generated by the respective antenna coils. In the diagram, the line 602 indicates a transition of the electromotive force in the first antenna coil 102 while the line 601 indicates a transition of the electromotive force in the second antenna coil 103. Assuming that a given distance between the contactless IC card 11 and the reader/writer 20 is d1, the electromotive force generated by the first antenna coil 102 in the predetermined distance d1 is presented by WA, and the electromotive force generated by the second antenna coil 103 is presented by WB, WB is greater than WA. That is to say that the electromotive force generated by the second antenna coil 103 that is closer to the reader/writer 20 is stronger. Therefore, the application selecting/executing unit 215 selects the application B associated with the second antenna coil 103 as the application to be executed (S305), reads out the application B selected from the program storing unit 216 and activates the application (S306).

As shown in FIG. 6A, in the case where the user passes the contactless IC card with the back side, namely the side of the first antenna coil 102, facing the reader/writer 20, WA is greater than WB. That is to say that the electromotive force generated by the first antenna coil 102 that is closer to the reader/writer 20 is stronger. Therefore, the application selecting/executing unit 215 selects the application A associated with the first antenna coil 102 as the application to be executed (S304), reads out the selected application A from the program storing unit 216 and activates the application (S306).

Thus as described above, in the contactless IC card according to the first embodiment, the electromotive forces respectively generated by plural antenna coils are compared so that an application is selected based on the comparison. It is therefore possible to easily switch between the applications in the contactless IC card by passing the contactless IC card with either front or back side facing the reader/writer 20, in the case of passing the contactless IC card.

It should be noted that a horizontal axis indicates "a distance from reader/writer", but it may be "a time when the contactless IC card passes over (or approaches) the reader/writer" instead. This is because the distance between the contactless IC card and the reader/writer can be replaced with a time when the contactless IC card passes over the reader/writer in the case where the contactless IC card approaches the reader/writer at a constant speed.

SECOND EMBODIMENT

Next, the contactless IC card according to the second embodiment of the present invention will be explained.

In the first embodiment, an example of the contactless IC card having two antenna coils: each is laid beneath each surface of the card.

The present invention, however, is not limited to this, and the case of laying the antenna coils side by side beneath one surface of the contactless IC card is conceivable. The second embodiment describes an example of the contactless IC card in which the antenna coils are laid side by side beneath one surface of the card.

It should be noted that the hardware configuration of the contactless IC card according to the second embodiment is as same as the one shown in FIG. 3, and the functional structure is as same as the one shown in FIG. 4. The description is therefore omitted.

The following explains in detail the operation of the contactless IC card according to the second embodiment with reference to FIGS. 8 and 9.

Figure 8A:
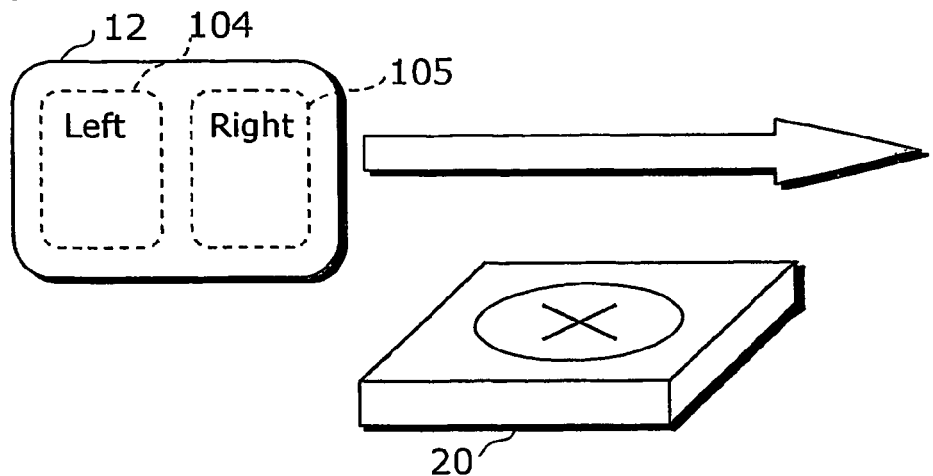
FIG. 8A is a diagram for explaining the method of operating the contactless IC card according to a second embodiment of the present invention.

FIG. 8A is a diagram for explaining the method of operating the contactless IC card 12 according to the second embodiment while FIG. 9 is a flowchart showing the procedure used in operating the contactless IC card according to the second embodiment after the power supply until an application is selected. It should be noted that, in FIG. 9, the procedure different from the flowchart in FIG. 7 used for the description of the first embodiment is emphasized by a dotted line (S1001), and the same referential marks are put for the same procedure.

As shown in FIG. 8A, the contactless IC card 12 according to the second embodiment has a first antenna coil 104 at the left beneath one side of the card, and a second antenna coil 105 at the right beneath the same side. In the case where the user passes the contactless IC card 12 from the right side in which the second antenna coil 105 is laid, the electromotive forces generated are respectively measured by the first electromotive force measurement unit 311 and the second electromotive force measurement unit 312 (S302). The measured electromotive forces are then compared by the electromotive force comparing unit 313 (S307).

Figure 8B:
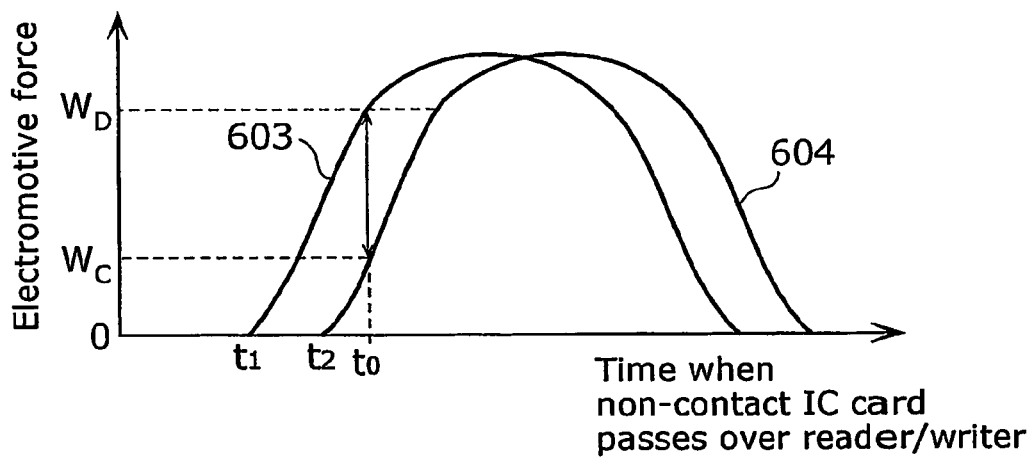
FIG. 8B is a diagram showing the relationship between the time when the contactless IC card passes over the reader/writer and the electromotive force generated by each antenna coil.

FIG. 8B is a diagram showing the relationship between the time when the contactless IC card 12 passes over the reader/writer and the electromotive forces generated by the respective antenna coils. In the diagram, the line 604 indicates a transition of the electromotive force generated by the first antenna coil 104 while the line 603 indicates a transition of the electromotive force generated by the second antenna coil 105. Assuming that a predetermined time when the contactless IC card 12 passes over the reader/writer 20 is, for instance, t0, the electromotive force generated by the first antenna coil 104 at the predetermined time t0 is presented by WC, and the electromotive force generated by the second antenna coil 105 is presented by WD, WD is greater than WC. That is to say that the second antenna coil 105 which firstly nears the reader/writer 20 generates the electromotive force stronger than the one generated by the first antenna coil 104. Therefore, the application selecting/executing unit 215 selects the application D associated with the second antenna coil 105 as the application to be executed (S309), reads out the application D selected from the program storing unit 216 and activates the application (S306).

As shown in FIG. 8A, in the case where the user passes the contactless IC card 12 over the reader/writer 20 from the left side, namely the side beneath which the first antenna coil 104 is laid, WC is greater than WD at the predetermined time t0. That is to say that the first antenna coil 104 that firstly nears the reader/writer 20 generates the electromotive force stronger than the one generated by the second antenna coil 105. Therefore, the application selecting/executing unit 215 selects the application C associated with the first antenna coil 104 (S308), reads out the selected application C selected from the program storing unit 216 and activates the application (S306).

Here, the predetermined time t0 when the contactless IC card 12 passes over the reader/writer 20 may be defined as a time when a predetermined time (e.g., 10 msec) has elapsed after a first time t1 when the electromotive force is firstly generated by an antenna coil (the second antenna coil 105), or as a time when a predetermined time (e.g., 10 msec) has elapsed after a second time t2 when the electromotive force is secondly generated by an antenna coil (the first antenna coil 104). Note that a predetermined time shall be a time taken for the electromotive force that is firstly generated to reach a peak.

The criterion for comparing the electromotive forces generated by the first antenna coil 104 and the second antenna coil 105 is not limited to the predetermined time t0.

For example, at the time when the second electromotive force generated by the first antenna coil 104 is detected after the detection of the first electromotive force generated by the second antenna coil 105, the electromotive force comparing unit 313 may output, to the application selecting/executing unit 215, information indicating that the firstly generated electromotive force is generated by the second antenna coil 105, namely, that the application associated with the second antenna coil 105 should be selected as the application to be executed.

Figure 8C:
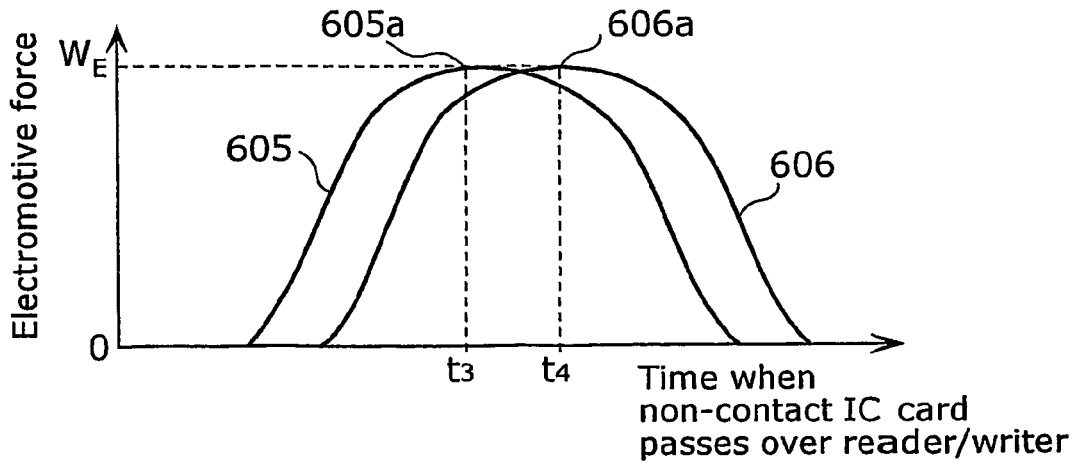
FIG. 8C is a diagram showing the relationship between the time when the contactless IC card passes over the reader/writer and the peak value of the electromotive force generated by each antenna coil.

As shown in FIG. 8C, the criterion for the comparison may be which of the antenna coils, the first antenna coil 104 and the second antenna coil 105, has firstly reached a peak value of the generated electromotive force.

FIG. 8C is a diagram showing the relationship between the time during which the contactless IC card passes over the reader/writer and the peak values of the electromotive forces generated by the respective antenna coils. In the diagram, the line 606 indicates a transition of the electromotive force generated by the first antenna coil 104 while the line 605 indicates a transition of the electromotive force generated by the second antenna coil 105. Assuming that WE presents the peak values of the electromotive forces generated by the respective antenna coils, the time t3 taken for the electromotive force generated by the second antenna coil 105 to reach the peak value 605a comes earlier than the time t4 taken for the electromotive force generated by the first antenna coil 104 to reach the peak value 606a. Therefore, in this case, the electromotive force comparing unit 313 outputs, to the application selecting/executing unit 215, the information indicating that the firstly generated electromotive force is generated by the second antenna coil 105, namely, that the application associated with the second antenna coil 105 should be selected as the application to be executed.

It should be noted that the application associated with the antenna coil whose electromotive force firstly reaches a predetermined value may be selected.

Thus as described above, the contactless IC card according to the second embodiment compares the characteristics of the electromotive force such as the time when the electromotive force is respectively generated by plural antenna coils so that an application is selected based on the comparison. It is therefore possible for the user to easily switch between the applications in the contactless IC card by changing the direction in which he/she passes the contactless IC card.

THIRD EMBODIMENT

The following describes the contactless IC card according to the third embodiment of the present invention.

The third embodiment describes the case in which the first and second embodiments are combined, that is, the case where the contactless IC card has four antenna coils: two antenna coils that are laid side by side beneath the surface of the front side and another two antenna coils that are laid in the same way beneath the surface of the back side.

It should be noted that the hardware configuration of the contactless IC card according to the third embodiment of the present invention is as same as the one shown in FIG. 3 except that the former additionally includes the following: a third antenna coil; a third electromotive force measurement unit for measuring the electromotive force generated by the third antenna coil; a fourth antenna coil; and a fourth electromotive force measurement unit for measuring the electromotive force generated by the fourth antenna coil. The description is therefore omitted. The functional structure of the present contactless IC card is as same as the one shown in FIG. 4.

Figure 10A:
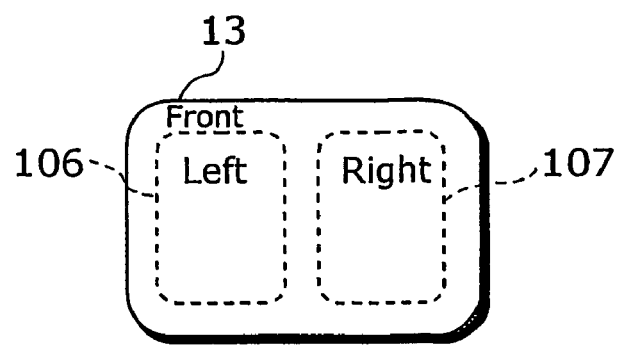
FIG. 10A is a plain view showing the appearance of one side of the contactless IC card according to a third embodiment of the present invention.
Figure 10B:
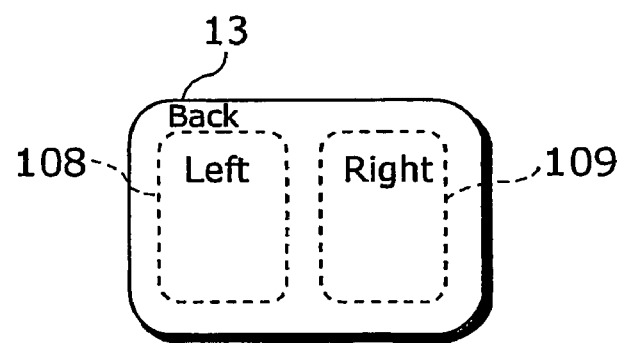
FIG. 10B is a plain view showing the appearance of the other side of the contactless IC card according to the third embodiment.
Figure 10C:
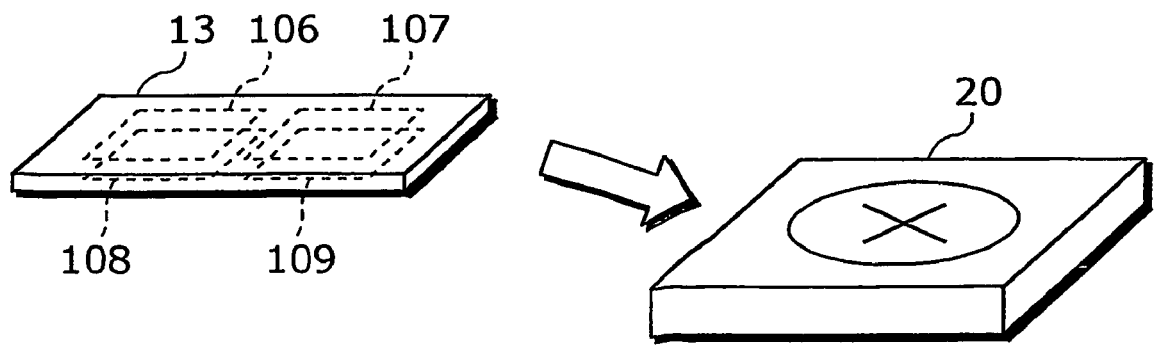
FIG. 10C is a diagram for explaining the method of operating the contactless IC card according to the third embodiment.
Figure 11:
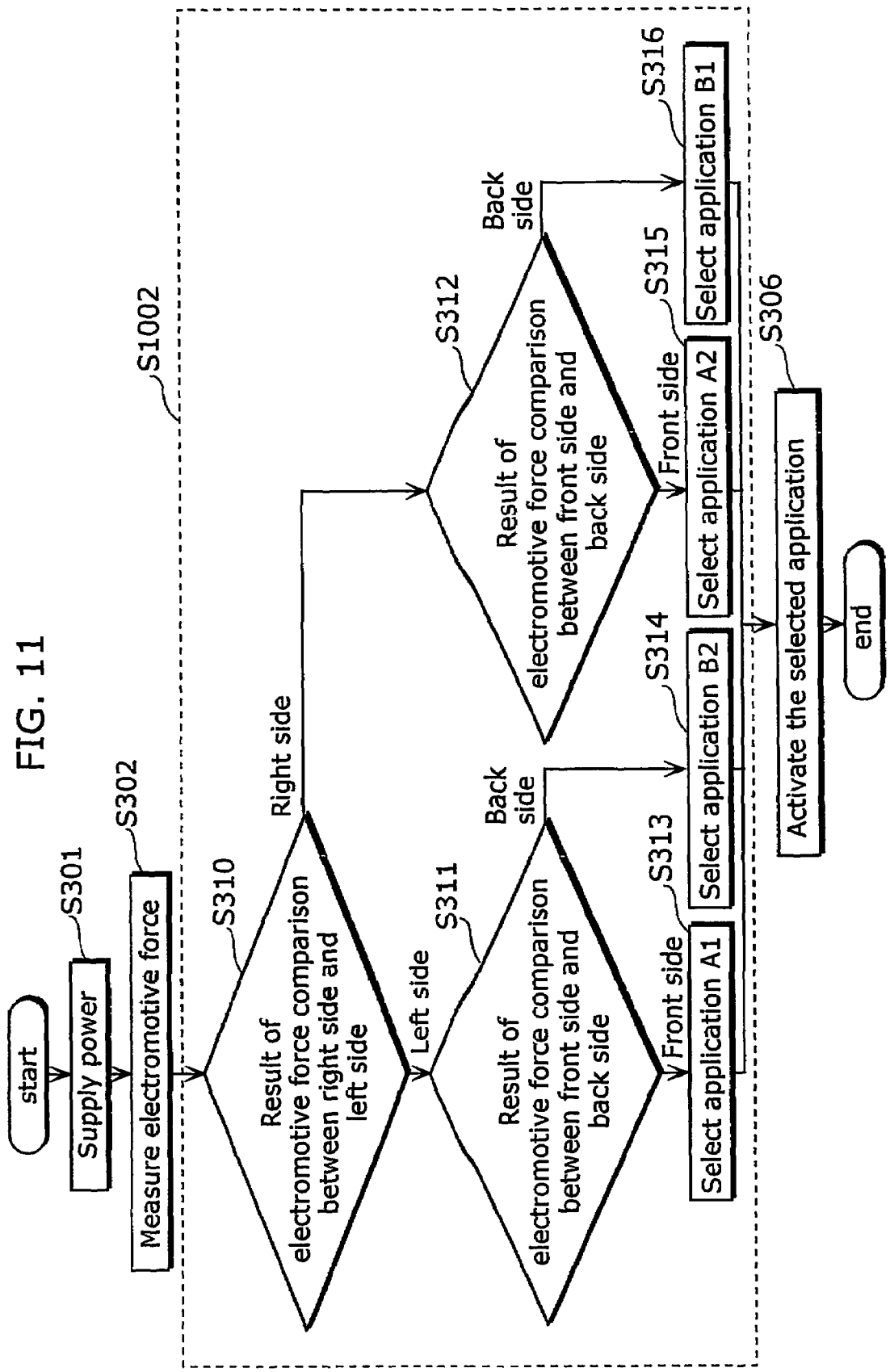
FIG. 11 is a flowchart showing the procedure used in operating the contactless IC card according to the third embodiment.

The following describes the operation of the contactless IC card according mainly to the third embodiment with reference to FIGS. 10 and 11.

FIG. 10A is a plain view showing the appearance of one side (front) of the contactless IC card 13 according to the third embodiment. As shown in the diagram, a first antenna coil 106 is laid at the left side beneath the surface of the front side of the contactless IC card 13 while a second antenna coil 107 is laid at the right side.

FIG. 10B is a plain view showing the appearance of the other side (back) of the contactless IC card 13. As shown in the diagram, a third antenna coil 108 is laid at the left side beneath the surface of the back side of the contactless IC card 13 while a fourth antenna coil 109 is laid at the right side.

FIG. 10C is a diagram for explaining the method of operating the contactless IC card 13 while FIG. 11 is a flowchart showing the procedure used in operating the contactless IC card 13 after the power is supplied until an application is selected. It should be noted that, in FIG. 11, the procedure different from the flowchart in FIGS. 7 and 9 used for the description in the first and second embodiments is emphasized by a dotted line (S1002), and the same referential marks are put for the same procedure.

As shown in FIG. 10C, in the case where the user passes the contactless IC card 13 over the reader/writer 20 from the right side of the back side beneath which the fourth antenna coil 109 is laid, the electromotive forces generated by the respective antenna coils are measured respectively by the corresponding electromotive force measurement units (S302).

As shown in FIG. 11, firstly, the electromotive force comparing unit 313 compares the electromotive force generated by the first antenna coil 106 or the third antenna coil 108 which is laid beneath the left side of the contactless IC card 13 and the electromotive force generated by the second antenna coil 107 or the fourth antenna coil 109 which is laid on the right side (S310). In this case, the comparison in the contactless IC card 13 between the electromotive force generated on the left and the one generated on the right is made by comparing the respective times at which each electromotive force is generated, as in the second embodiment. In the example shown in FIG. 10C, the electromotive force comparing unit 313 judges that the electromotive force generated by the antenna coil laid at the right side of the contactless IC card 13 is stronger.

Then, the electromotive force generated by the second antenna coil 107 laid beneath the surface of the front side of the contactless IC card 13 and the one generated by the fourth antenna coil 109 laid beneath the surface of the back side are compared (S312). Here, the comparison in electromotive force between the front and back sides of the contactless IC card 13 is made by comparing the amounts of the electromotive forces as in the first embodiment. In the example shown in FIG. 10C, the electromotive force comparing unit 313 judges that the electromotive force generated by the antenna coil laid beneath the surface of the back side of the contactless IC card 13 is stronger.

Consequently, the electromotive force comparing unit 313 judges that the electromotive force generated by the fourth antenna coil 109 is the strongest. The application selecting/executing unit 215 selects the application B1 corresponding to the fourth antenna coil 109 as the application to be executed (S316), reads out the application B1 selected from the program storing unit 216 and activates the application (S306).

In the case where the user passes the contactless IC card 13 over the reader/writer 20 from the left of the surface of the back side beneath which the third antenna coil 108 is laid, the electromotive force generated by the third antenna coil 108 is the strongest. The application selecting/executing unit 215 selects the application B2 corresponding to the third antenna coil 108 as the application to be executed (S314), reads out the application B2 selected from the program storing unit 216 and activates the application (S306).

As shown in FIG. 10C, in the case where the user passes the contactless IC card 13 over the reader/writer 20 from the left of the surface of the front side beneath which the first antenna coil 106 is laid, the electromotive force generated by the first antenna coil 106 is the strongest. The application selecting/executing unit 215 therefore selects the application A1 corresponding to the first antenna coil 106 as the application to be executed (S313), reads out the application A1 selected from the program storing unit 216 and activates the application (S306).

In the case where the user passes the contactless IC card 13 over the reader writer 20 from the right of the surface of the front side beneath which the second antenna coil 107 is laid, the electromotive force generated by the second antenna coil 107 is the strongest. The application selecting/executing unit 215 therefore selects the application A2 corresponding to the second antenna 107 as the application to be executed (S315), reads out the application A2 selected from the program storing unit 216 and activates the application (S306).

It should be noted that FIG. 11 shows the example of comparing the electromotive force between the front and the back sides after the comparison between the left and right sides of the contactless IC card 13. The order of procedure, however, can be put in reverse, and the comparison between the right and left sides may be made after the comparison between the front and back sides.

Thus as described above, with the contactless IC card according to the third embodiment, the application to be executed is selected as follows: judging whether it is a front side or a back side of the card by comparing the amounts of the electromotive forces respectively generated by plural antenna coils, and then, judging whether it is a right side or a left side of the card by comparing the respective times at which each electromotive force is generated, for instance. It is therefore possible for the user to switch between the applications in the contactless IC card by switching the direction in which and the face with which the user passes the contactless IC card over the reader/writer.

FOURTH EMBODIMENT

The following describes the contactless IC card according to the fourth embodiment of the present invention.

The fourth embodiment describes the case in which the contactless IC card has four antenna coils on one side (front) and another four antenna coils on the other side (back). This results from considering all the possible ways of distinguishing the applications to be activated when the contactless IC card is neared to the reader/writer. It should be noted that the hardware configuration of the contactless IC card according to the fourth embodiment is different from the configuration shown in FIG. 3 in that the third through eighth antenna coils and the third through eighth electromotive force measurement units for respectively measuring the electromotive forces generated by the third through eighth antenna coils are added, but the basic structure is the same. The description is therefore omitted. The same applies to the functional structure.

Figure 12A:
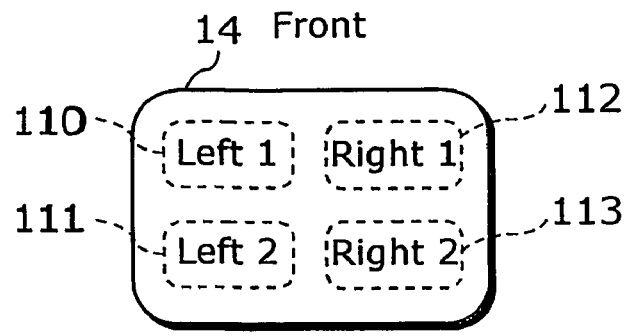
FIG. 12A is a plain view showing the appearance of one side of the contactless IC card according to a fourth embodiment of the present invention.

FIG. 12A is a plain view showing the appearance of the front side of the contactless IC card 14 according to the fourth embodiment. As shown in the diagram, a first antenna coil 110, a second antenna coil 111, a third antenna coil 112 and a fourth antenna coil 113 are respectively laid beneath the upper left, the lower left, the upper right and the lower right, of the front side of the contactless IC card 14.

Figure 12B:
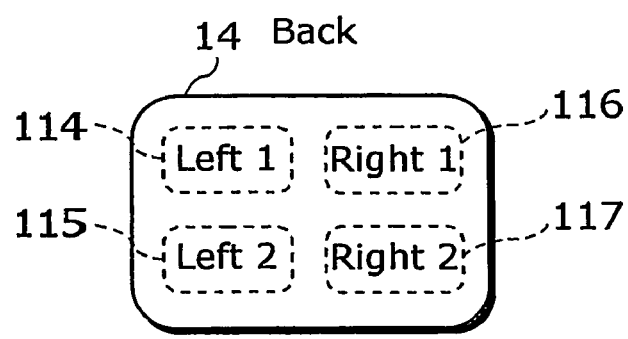
FIG. 12B is a plain view showing the appearance of the other side of the contactless IC card according to the fourth embodiment.

FIG. 12B is a plain view showing the appearance of the back side of the contactless IC card. As shown in the diagram, a fifth antenna coil 114, a sixth antenna coil 115, a seventh antenna coil 116 and an eighth antenna coil 117 are respectively laid beneath the upper left, the lower left, the upper right and the lower right, of the back side of the contactless IC card 14.

Figure 12C:
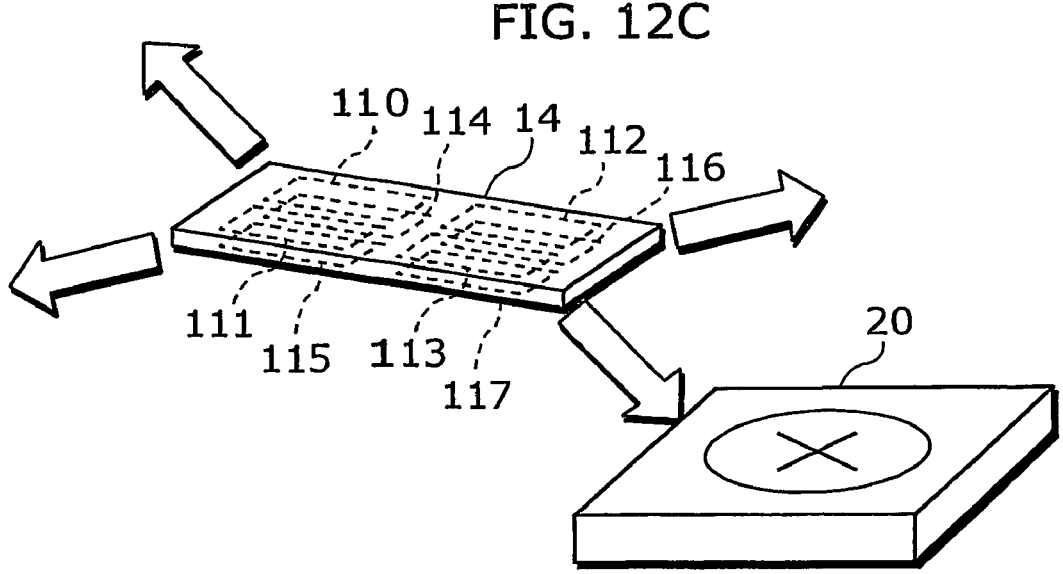
FIG. 12C is a diagram for explaining the method of operating the contactless IC card according to the fourth embodiment.

FIG. 12C is a diagram for explaining the method of operating the contactless IC card 14.

As shown in FIG. 12C, the user can switch to the desired application by bringing either of the four corners on one side of the contactless IC card 14 closer to the reader/writer 20. Similarly, the user can also switch to the desired application by bringing either of the four corners of the other side of the contactless IC card 14. Namely, the user can switch between a total of eight applications with a single contactless IC card 14. It should be noted that the procedure for the contactless IC card 14 to determine the application to be activated is as same as the one described in the third embodiment, and the electromotive force comparing unit 313 can judge whether it is a front side or a back side of the card by comparing between the amount of the electromotive force generated in the front side and the one generated in the back side, and judge whether it is upper/lower and right/left of the card by comparing the respective times at which each electromotive force is generated, for instance.

As described above, with the contactless IC card 14 according to the fourth embodiment, it is possible for the user to switch between multiple applications in the contactless IC card by switching the direction in which and the face with which the user passes the contactless IC card 14 over the reader/writer.

Thus as described above, the contactless IC card according to the present invention is explained based on each of the embodiments, however, the present invention is not limited to these embodiments, and various variations and modifications can be made within the scope of the present invention.

For example, in each of the above embodiments, it is explained that the processing of power supply (S301 in FIG. 7), electromotive force measurement (S302 in FIG. 7) and electromotive force comparison (S303 in FIG. 7) are performed by another unit. The processing, however, may be performed by the CPU 212.

Each of the function blocks in the block diagram shown in FIG. 4 is typically realized as an LSI that is an integrated circuit. The LSI may be constructed in single or plural chip form (e.g., functional block other than memory may be constructed in chip form).

Here, the functional block is represented as the LSI, however, it can be names as an IC, a system LSI, a super LSI, or an ultra LSI, depending on the integration density.

The method to realize an integrated circuit is not limited to the LSI and it can be realized with a dedicated circuit or a general-purpose processor. A Field Programmable Gate Array (FPGA) that is programmable after the fabrication of LSI, or a reconfigurable processor that can reconfigure the connection and setting of the circuit cells in the LSI after the fabrication may be used instead.

Moreover, with the arrival of the technique, in place of the LSI, for integrating into a circuit, along with the progress in semiconductor technique or another technique that derives from the progress, the functional block can be surely integrated using it. The application of biotechnology can be construed as a possible method for integration.

Among the functional blocks shown in FIG. 4, a unit for storing data may belong to a different structure without being integrated in chip form.

As shown in FIGS. 13A through 13D, labels may be attached or a display process may be performed onto the contactless IC card so that the user acknowledges the part where the antenna coil corresponding to the application to be provided is laid.

Figure 13A:
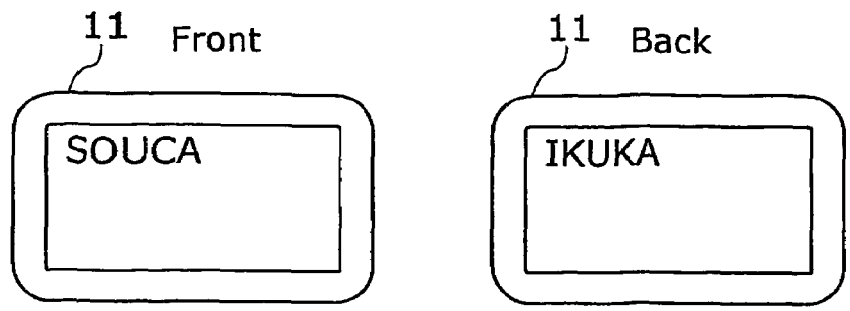
FIGS. 13A through 13D are appearance diagrams respectively showing labels attached or a display process performed onto the contactless IC card for identifying the application programs stored in the IC card.

As shown in FIG. 13A, in the case of attaching labels or performing a display process onto the front and back sides of the contactless IC card 11, the labels indicating the respective applications may be attached on the back side beneath which the antenna coil corresponding to the application is laid so that the user can easily discern which application is activated in bringing the contactless IC card 11 closer to the reader/writer 20.

In the case of FIG. 13A, the antenna coil corresponding to the application "SOUCA" is laid beneath the surface of the back side of the contactless IC card 11 while the antenna coil corresponding to the application "IKUKA" is laid beneath the surface of the front side of the contactless IC card 11. Namely, a label or a display indicating the application associated with the antenna coil laid beneath the surface of the front side is attached on the surface of the back side whereas a label or a display indicating the application associated with the antenna coil laid beneath the surface of the back side is attached on the surface of the front side.

Figure 13B:
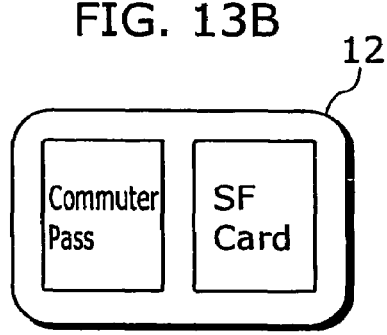
Figure 13C:
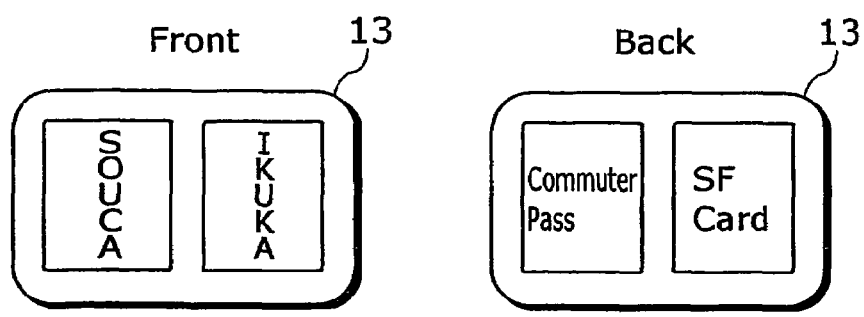

As shown in FIG. 13B, labels may be attached or a display process may be performed onto the part beneath which the antenna coil is laid at one side of the contactless IC card 12 so that the user can discern the application associated with the antenna coil.

Figure 13D:
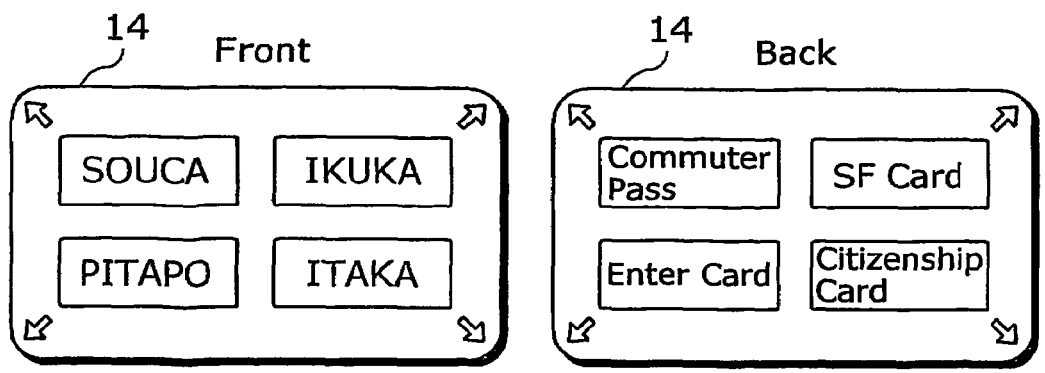

In the case where plural applications are installed in the same side of the contactless IC card, it is preferable, as indicated by the arrows placed at the four corners of the contactless IC card 14 shown in FIG. 13D, to explicitly show the user from which direction he/she needs to pass the contactless IC card 14 over the reader/writer 20.

Figure 14:
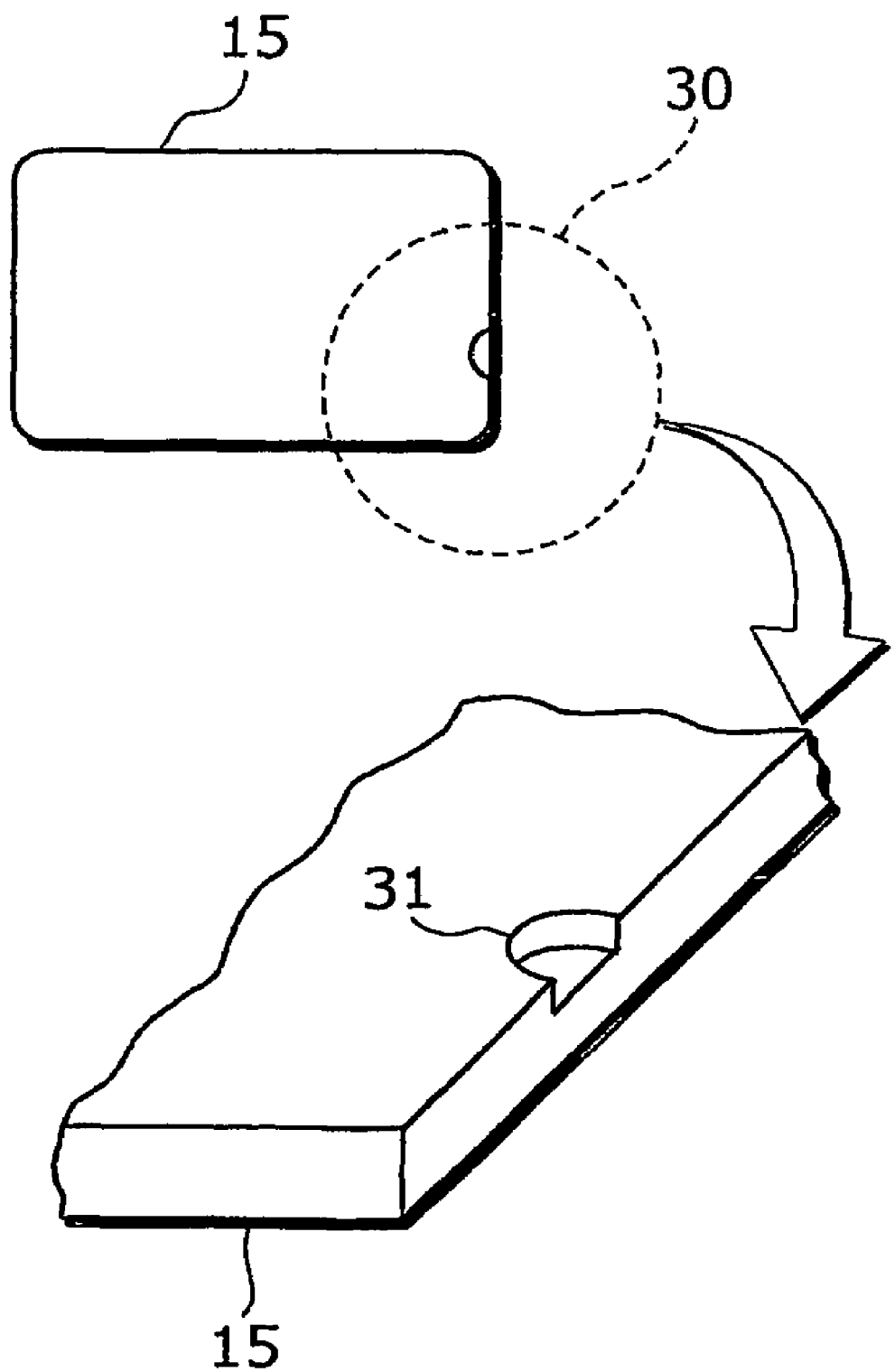
FIG. 14 is an appearance diagram showing the contactless IC card with a part to which notching is performed for acknowledging the direction and the face of the card.

Further in the case where the user cannot check the contactless IC card with eyes, a concave portion 31 may be formed by notching the edge in the part 30 of the contactless IC card 15, as shown in FIG. 14. Thus, the user can verify the front and back sides of the contactless IC card 15, and the direction in which the card is passed by feeling the edge of the contactless IC card 15 with the finger.

It should be noted that the present description focuses mainly on the contactless IC card in a flat card shape. The present invention, however, is not limited to such contactless IC card. The shape of the card can be varied and the present invention can be applied to other fields as well.

For example, the present invention can be applied to a toy or a game, for instance, a spherical object on which plural antenna coils are placed, and in which the behavior (e.g., change in object's color) is programmed corresponding to the respective antenna coils so that the behavior of the object changes according to the face that contacts the reader/writer.

In the present specification, "electromotive force" can be interpreted as "electric power" "voltage" or "electric current". This is because an antenna coil has constant impedance for electromagnetic waves with a constant frequency and therefore induced voltage or electric current changes according to the amount of the electric power induced by the antenna coil.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The contactless IC card according to the present invention is comprised of the following: plural antenna coils; plural electromotive force measuring units for measuring respective electromotive forces; an electromotive force comparing unit for comparing the characteristics of the electromotive forces that are measured; and an application selecting/executing unit for selecting an application based on the comparison and activating the application. The present invention is useful as the contactless IC card that can switch between plural applications according to the user's operation, and is particularly suitable for use in the contactless IC cards intended for transportation or public use.

The invention claimed is:

1. A contactless integrated circuit (IC) card that can execute a plurality of application programs, comprising:

a plurality of antenna coils, each generating an electromotive force by receiving electromagnetic waves from a reader/writer;

an electromotive force measuring unit operable to measure the electromotive force generated by each of the antenna coils when the contactless IC card is passed over the reader/writer;

an electromotive force comparing unit operable to compare characteristics of the electromotive forces which are measured by the electromotive force measuring unit; and an application selecting/executing unit operable to select one application program based on the comparison made by the electromotive force comparing unit, and execute the selected application program.

2. A contactless IC card according to claim 1, wherein the electromotive force comparing unit compares strengths of the electromotive forces, and the application selecting/executing unit executes the application program associated with an antenna coil that has generated the strongest electromotive force.

3. A contactless IC card according to claim 1, wherein the electromotive force comparing unit compares strengths of electromotive forces respectively generated by the plurality of antenna coils at a second time when a predetermined amount of time has elapsed since a first time when an electromotive force is firstly measured by the electromotive force measuring unit, and the application selecting/executing unit executes the application program associated with an antenna coil that has generated the strongest electromotive force at the second time.

4. A contactless IC card according to claim 1, wherein the electromotive force comparing unit compares respective times at which each electromotive force reaches a peak value, the electromotive force being generated by said each antenna coil and measured by the electromotive force measuring unit, and the application selecting/executing unit executes the application program associated with an antenna coil whose electromotive force has firstly reached a peak value.

5. A contactless IC card according to claim 1, wherein said antenna coils are laid at two different depths in the contactless IC card.

6. A contactless IC card according to claim 1, wherein a part of the antenna coils are laid beneath a surface of a front side and another part of the antenna coils are laid beneath a surface of a back side of the contactless IC card.

7. A contactless IC card according to claim 1, wherein a part of the antenna coils are laid on a right side and another part of the antenna coils are laid on a left side beneath one surface or both surfaces of the contactless IC card.

8. A contactless IC card according to claim 1, further comprising a program storing unit operable to store the plurality of application programs respectively associated with each of the antenna coils.

9. A contactless IC card according to claim 8, further comprising display units operable to display each of the application programs associated with said each antenna coil.

10. A contactless IC card according to claim 9, wherein the display units are marks indicating a correspondence between a direction in which the contactless IC card is neared to the reader/writer and an application program to be executed.

11. A contactless IC card according to claim 10,
wherein the plurality of antenna coils include: a first antenna coil laid beneath a surface of a front side of the contactless IC card; and a second antenna coil laid beneath a surface of the back side, the display units include: a first mark indicating a first application program associated with the first antenna coil; and a second mark indicating a second application program associated with the second antenna coil, the first mark is attached to the surface of the back side, and the second mark is attached to the surface of the front side.

12. A contactless IC card according to claim 1,
wherein a concave portion is formed by notching an edge on one surface of the contactless IC card.

13. An application selection method for a contactless integrated circuit (IC) card that can execute a plurality of application programs, wherein the contactless IC card has a plurality of antenna coils, each generating an electromotive force by receiving electromagnetic waves from a reader/writer, and the method comprises:

measuring the electromotive force generated by each of the antenna coils;

comparing characteristics of the measured electromotive forces; and selecting one application program based on the comparison and executing the selected application program.

14. A computer-readable storage medium having stored thereon a program for a contactless integrated circuit (IC) card that can execute a plurality of application programs, wherein the contactless IC card has a plurality of antenna coils, each generating an electromotive force by receiving electromagnetic waves from a reader/writer, and the program causes a computer to execute the steps of:

measuring the electromotive force generated by each of the antenna coils;

comparing characteristics of the measured electromotive forces; and selecting one application program based on the comparison and executing the selected application program.

15. An integrated circuit for controlling a contactless integrated circuit (IC) card that can execute a plurality of application programs, wherein the contactless IC card has a plurality of antenna coils, each generating an electromotive force by receiving electromagnetic waves from a reader/writer, and the integrated circuit comprises:

an electromotive force measuring unit operable to measure the electromotive force generated by each of the antenna coils;

an electromotive force comparing unit operable to compare characteristics of the electromotive forces which are measured by the electromotive force measuring unit; and an application selecting/executing unit operable to select one application program based on the comparison made by the electromotive force comparing unit, and execute the selected application program.

* * * * *